Feb. 10, 1948. W. R. HARRY 2,435,587
COMPRESSIONAL WAVE SIGNALING DEVICE
Filed July 14, 1943

INVENTOR
W. R. HARRY
BY
Walter E. Kiesel
ATTORNEY

Patented Feb. 10, 1948

2,435,587

UNITED STATES PATENT OFFICE 2,435,587

COMPRESSIONAL WAVE SIGNALING DEVICE

William R. Harry, Summit, N. J., assignor to Bell Telephone Laboratories, Incorporated, New York, N. Y., a corporation of New York Application July 14, 1943, Serial No. 494,640

3 Claims. (Cl. 177—386)

This invention relates to compressional wave signaling devices and more particularly to submarine signal receivers and detectors especially suitable for use in systems for locating sources of compressional wave signals.

One object of this invention is to facilitate the accurate location of a source of submarine signals, with respect to a reference point or region. More specifically, one object of this invention is to convert detected compressional wave submarine signals into electrical signals accurately related to the direction of the source of the submarine signals with respect to the station at which these signals are detected.

Another object of this invention is to improve the response characteristic of submarine signaling devices. More specifically, another object of this invention is to obtain a substantially uniform response characteristic throughout a wide range of frequencies for a compressional wave receiver or detector.

A further object of this invention is to enable mounting of a submarine signaling device upon or from an external wall of a vessel in such manner that the device will be substantially unaffected by forces effective thereon due to motion of the vessel but will be highly sensitive to submarine signals to be detected thereby.

In one illustrative embodiment of this invention, a compressional wave submarine signal receiver or detector comprises a hollow rigid housing vibratile bodily throughout a wide frequency range and an electromagnetic transducer within the housing and responsive to vibrations thereof.

In accordance with one feature of this invention, the transducer comprises a plurality of inertia type translating elements constructed and arranged to produce an electrical output proportional to the velocity components of submarine signals in coordinately related directions. In one construction, four such elements are mounted in quadrature, symmetrically about a center point, and opposite elements are axially aligned and connected electrically, for example in series. Each pair of elements has a directional pattern in the form of a figure 8 and the two patterns have a common center.

In accordance with another feature of this invention, the several translating elements are mounted upon a common rigid support so that all the elements are actuated in phase in accordance with compressional waves incident upon the housing.

In accordance with a further feature of this invention, the housing comprises a resilient covering and is supported by a resilient stem extending from the housing normal to the direction of vibration of the translating elements and by a frame member contacting the resilient covering along a line in a transverse plane in which the axes of alignment of the opposite translating elements lie.

The invention and the above-noted and other features thereof will be understood more clearly and fully from the following detailed description with reference to the accompanying drawing in which.

Figure 2:
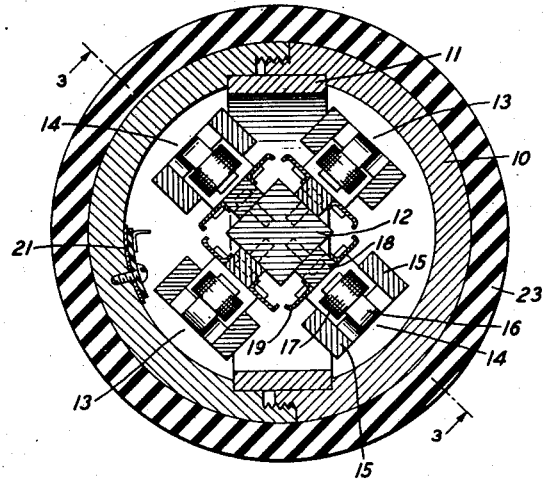
Fig. 2 is a cross-sectional view of the submarine signaling device shown in Fig. 1.
Figure 3:
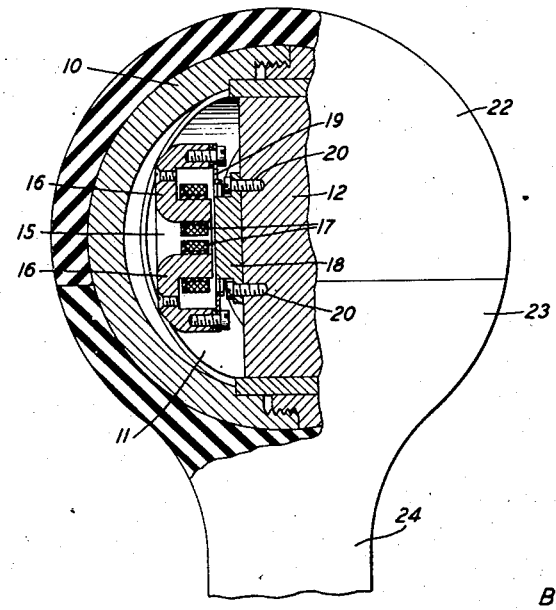
Fig. 3 is a side view of the submarine signaling device shown partly in section along plane 3—3 of Fig. 2.

Referring now to the drawing, the submarine signaling device illustrated comprises a spherical metallic housing or shell 10, which may be formed of two parts threaded to one another as shown in Fig. 2. The shell is of a material having a high ratio of elastic modulus to density and of such dimensions as to vibrate bodily and without relative motion between sections thereof throughout the range of frequencies the signaling device is intended to translate. For example, in a signaling device intended for operation at frequencies up to of the order of 10,000 cycles per second, a shell of aluminum alloy, known commercially as Duralumin, approximately 2 inches in diameter and $\frac{1}{16}$ inch in thickness has been found to be satisfactory. Affixed within the shell 10, as by clamping thereof between the two parts of the shell as shown in Fig. 2, is a ring 11, for example of steel, to which a diametrically extending rigid support or bar 12, for example of metal, of rectangular cross-section is secured.

The support or bar 12 mounts two pairs of similar electromagnetic units 13 and 14 of the inertia type and of the general construction disclosed in Patent 2,202,906, granted June 4, 1940, to Melville S. Hawley. The units of each pair are aligned axially and the axes of alignment of the two pairs are at right angles and pass through a common center point, which is also the center of the shell, all of the units being equally spaced from this point. Each unit comprises a pair of bar magnets 15, U-shaped pole-pieces 16 having signal coils 17 thereon, and an armature 18 overlying the adjacent ends of the pole-pieces and resiliently connected to the pole-pieces by a spring 19. Each armature is secured firmly to the bar or support 12 by screws 20. The units of each pair are connected electrically in series and the several units are connected to a terminal assembly 21 secured to the shell, by suitable conductors, not shown.

As described hereinafter, the shell is mounted so as to be vibratile bodily in response to compressional wave signals incident thereon. The support or bar 12 vibrates with the shell and thus actuates the several armatures 18. Because of the mass of the magnets and pole-pieces, actuation of the armatures results in relative movement between each armature and the magnetic structure supported therefrom and signal voltages are generated in the coils 17. Each pair of units, as will be apparent, constitutes a bidirectional pressure gradient translating element, the directional pattern of which is a figure 8 in form. The patterns of the two pairs are substantially identical, have a common center and are at right angles to each other so that accurate symmetry of the patterns about the center is obtained. The outputs of the two elements, i. e., pairs of units, are proportional to the velocity components of the compressional wave signals incident upon the shell 10 and in combination provide accurate information as to the direction of the source of the compressional wave signals with respect to the signal translating device. The outputs, of course, may be amplified by suitable apparatus and supplied to a suitable indicating instrument, such as a cathode ray oscillograph or meter, to produce a visual indication of the direction noted.

It will be appreciated that inasmuch as, as pointed out heretofore, the shell 10 is sufficiently rigid to vibrate bodily without substantial breaking up throughout the intended operating range of the device, distortion of the signals received, due to local vibrations in the shell, is prevented. Further, inasmuch as all the translating units are supported in immediate proximity from a common rigid support, the several armatures are actuated in phase and, thus, faithful translation of the signals is obtained. Hence, and in view of the accurate symmetry of the units and the directional patterns about a common point, the output of the units in combination is an accurate measure of the direction of the source of the signals received with respect to the center of the signal translating device.

Figure 1:
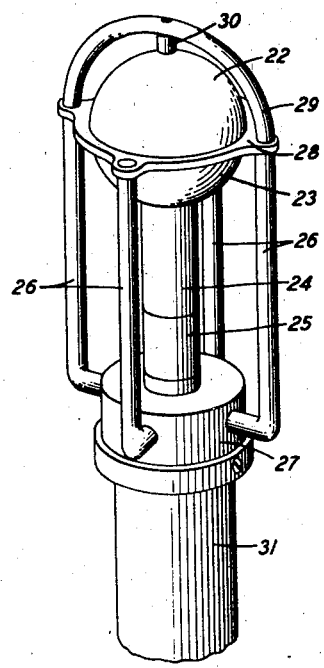
Fig. 1 is a perspective view of a submarine signaling device and a mounting therefor illustrative of one embodiment of this invention.

The shell 10 is provided with a protective and watertight cover which may be formed of two soft rubber parts 22 and 23 vulcanized to the shell and to each other, the part 23 having a hollow resilient stem portion 24 integral therewith through which leading-in conductors, not shown, leading from the terminal assembly 21, extend. As shown in Fig. 1, the stem 24 may be secured in water-tight relation to a coupler element 25 in a stand or support by which the signal translating device may be supported from a vessel.

The stand or support comprises a framework including a plurality of rigid parallel arms 26 extending from a base member 27, and a transverse ring-shaped member 28, the inner diameter of which is slightly smaller than the diameter of the rubber cover 22, 23 so that the ring-shaped member and the rubber cover are in intimate engagement. The plane of the member 28 is normal to the support or post 12. A curved protector arm 29 overlies the cover and carries, at its center, an abutment 30 which engages the cover part 22. Extending from the base member 27 is a rigid hollow support or pipe 31 by way of which the stand or support is mounted on or from a vessel, for example from the hull of a surface ship or from the hull or deck of a submarine.

It will be noted that the signaling device is, in effect, floatingly mounted within the framework yet is supported so that large amplitude movement thereof is prevented. It has been found that the stand or support construction described does not restrain vibration of the signaling device induced by the compressional waves to be detected and does not therefore, affect the response, yet the stand or support enables operation of the device even when the ship is traveling at moderate speeds, of the order of 10 knots, without mechanical failure and without an excessive noise level due to the support or stand.

Although the invention has been described with particular reference to devices adapted to have an output proportional to the velocity components of the signals in two directions at right angles to each other, it may be practised also in devices adapted to produce an output proportional to such components in three mutually perpendicular dimensions. In the latter case, three pairs of translating units are provided with the axes of the three pairs mutually perpendicular and passing through a common center, i. e., the center of the shell. The several units may be mounted upon a common rigid support suitably connected mechanically to the shell so that all the units are actuated in phase.

As pointed out heretofore, the upper frequency limit of the range of operation of the device is determined largely by the character of the shell. The response at the low frequency end of the range is dependent largely upon the characteristics of the translating units. Units of the general construction described hereinabove may have a fairly pronounced peak in their response characteristic at a fairly low frequency. If this frequency is within the range the device is intended to translate, means may be provided for reducing or suppressing this response peak. For example, damping members, such as pads of soft rubber or other vibration damping material may be provided between the magnets 15 and spring 19 to damp vibration thereof and thus reduce the response peak.

Although a specific embodiment of the invention has been shown and described, it will be understood that it is but illustrative and that various modifications may be made therein without departing from the scope and spirit of this invention as defined in the appended claims.

What is claimed is:

1. A submarine signaling device comprising a housing, inertia-type signal translating means within said housing and having its actuating element connected thereto, a supporting frame having a portion encompassing said housing, and resilient means on the outer surface of said housing and intimately engaged by said portion.

2. A submarine signaling device comprising a substantially spherical shell, inertia-type translating means within said shell and responsive to vibrations thereof, a resilient covering on said shell, a resilient supporting stem extending from said covering, and a supporting framework including a rigid annular member encompassing said shell and intimately engaging said covering.

3. A submarine signaling device comprising a substantially spherical housing, a rigid support post extending diametrically within said housing and affixed thereto for vibration therewith, means mounting said housing for bodily vibration in all directions normal to the longitudinal axis of said post, and a pair of bidirectional signal translating elements within said housing and actuated in accordance with transverse motion of said post, said elements having similar directional patterns and the two patterns being at right angles to each other, concentric and symmetrical about said axis, and each of said elements including a pair of electromagnetic units each comprising an armature fixed to said post, a magnet system anad resilient means supporting the magnet system from the armature.

WILLIAM R. HARRY.

REFERENCES CITED

The following references are of record in the file of this patent:

UNITED STATES PATENTS

| Number | Name | Date |
| --- | --- | --- |
| 1,393,471 | Wegel | Oct. 11, 1921 |
| 1,892,147 | Hayes | Dec. 27, 1932 |
| 2,202,906 | Hawley | June 4, 1940 |
| 1,129,565 | Gardner | Feb. 23, 1915 |